Dec. 28, 1965  F. CURRIE  3,225,893
ACCUMULATING CONVEYOR
Filed Oct. 15, 1962  6 Sheets-Sheet 1
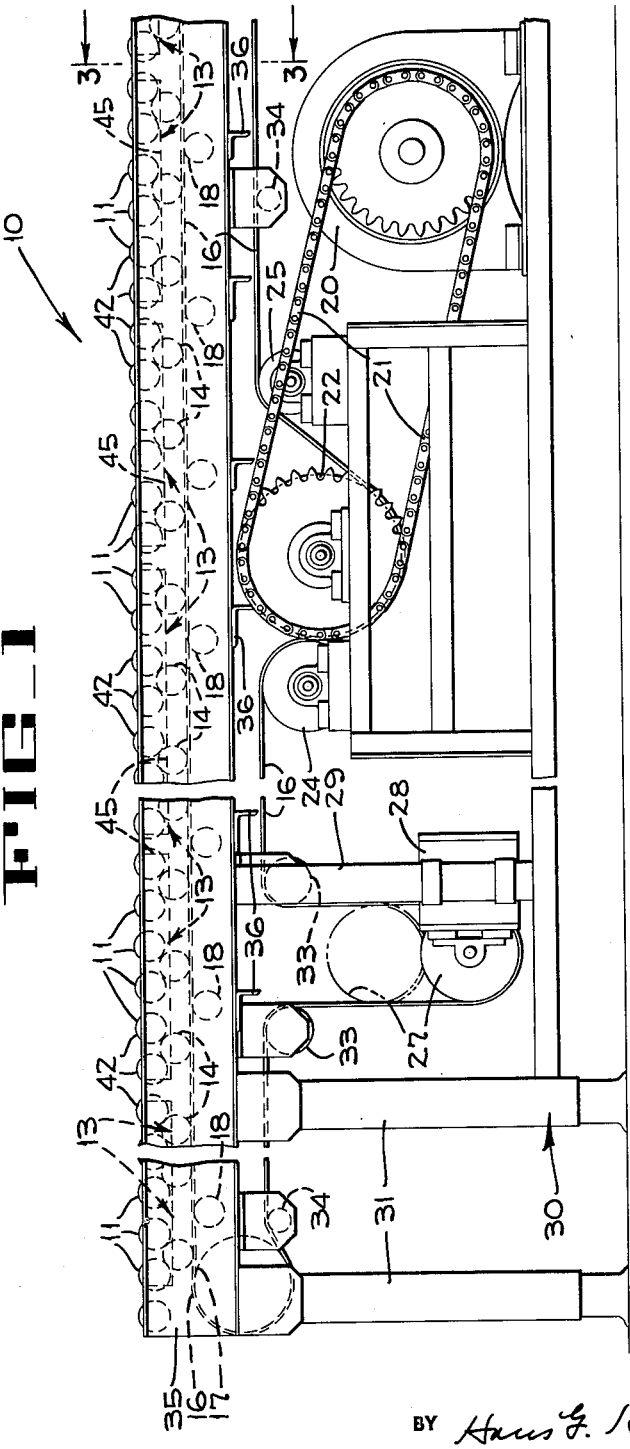
INVENTOR
FRANCIS CURRIE
BY *Hans G. Hoffmeister*
ATTORNEY Dec. 28, 1965  F. CURRIE  3,225,893
ACCUMULATING CONVEYOR
Filed Oct. 15, 1962  6 Sheets-Sheet 2

FIG_2

INVENTOR
FRANCIS CURRIE
BY Hans G. Hoffmeister
ATTORNEY

Dec. 28, 1965     F. CURRIE     3,225,893
ACCUMULATING CONVEYOR
Filed Oct. 15, 1962     6 Sheets-Sheet 3

INVENTOR
FRANCIS CURRIE
BY Hans G. Hoffmeister
ATTORNEY

Dec. 28, 1965     F. CURRIE     3,225,893
ACCUMULATING CONVEYOR
Filed Oct. 15, 1962     6 Sheets-Sheet 4
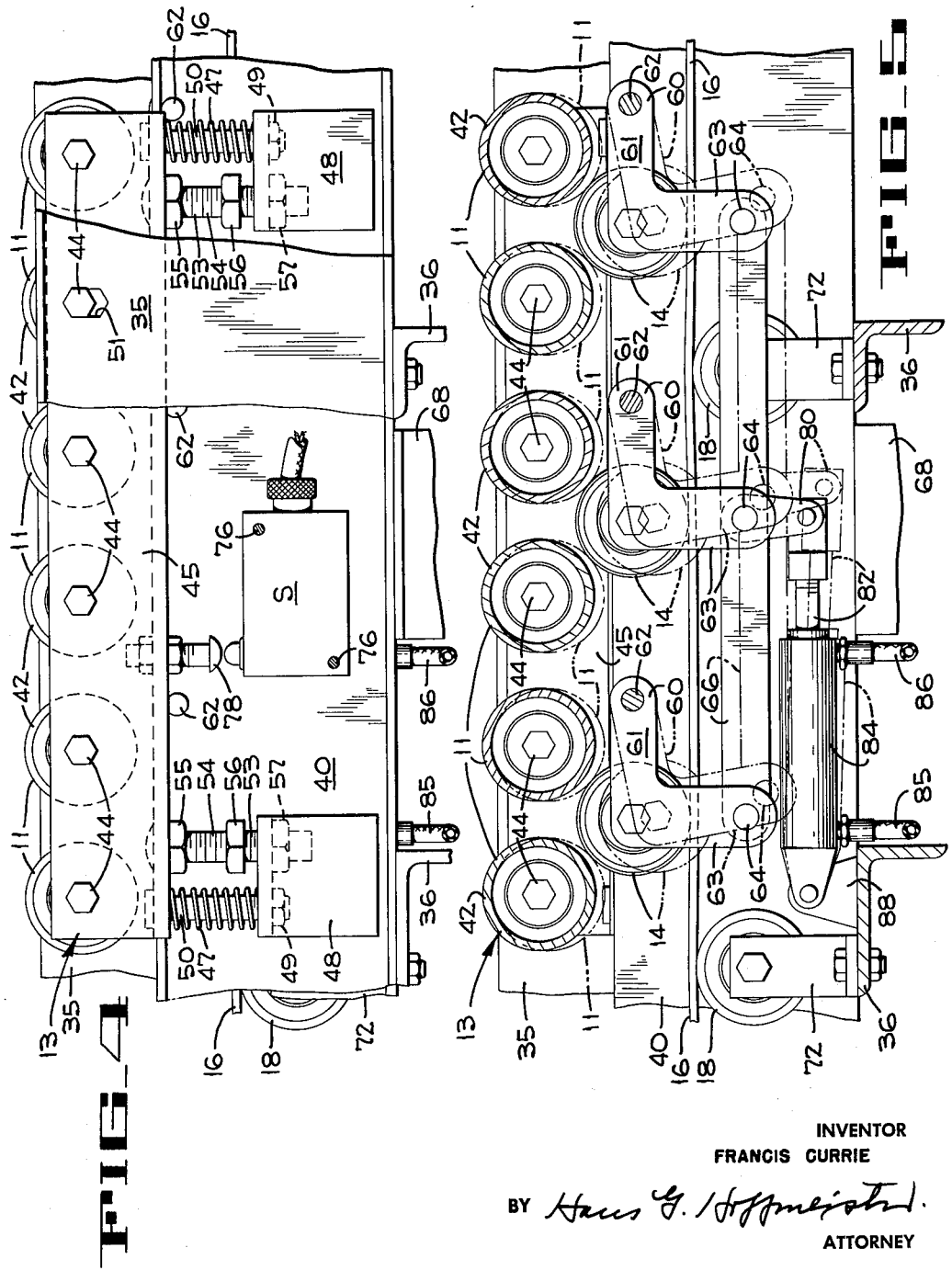
INVENTOR
FRANCIS CURRIE
BY Hans G. Hoffmeister
ATTORNEY

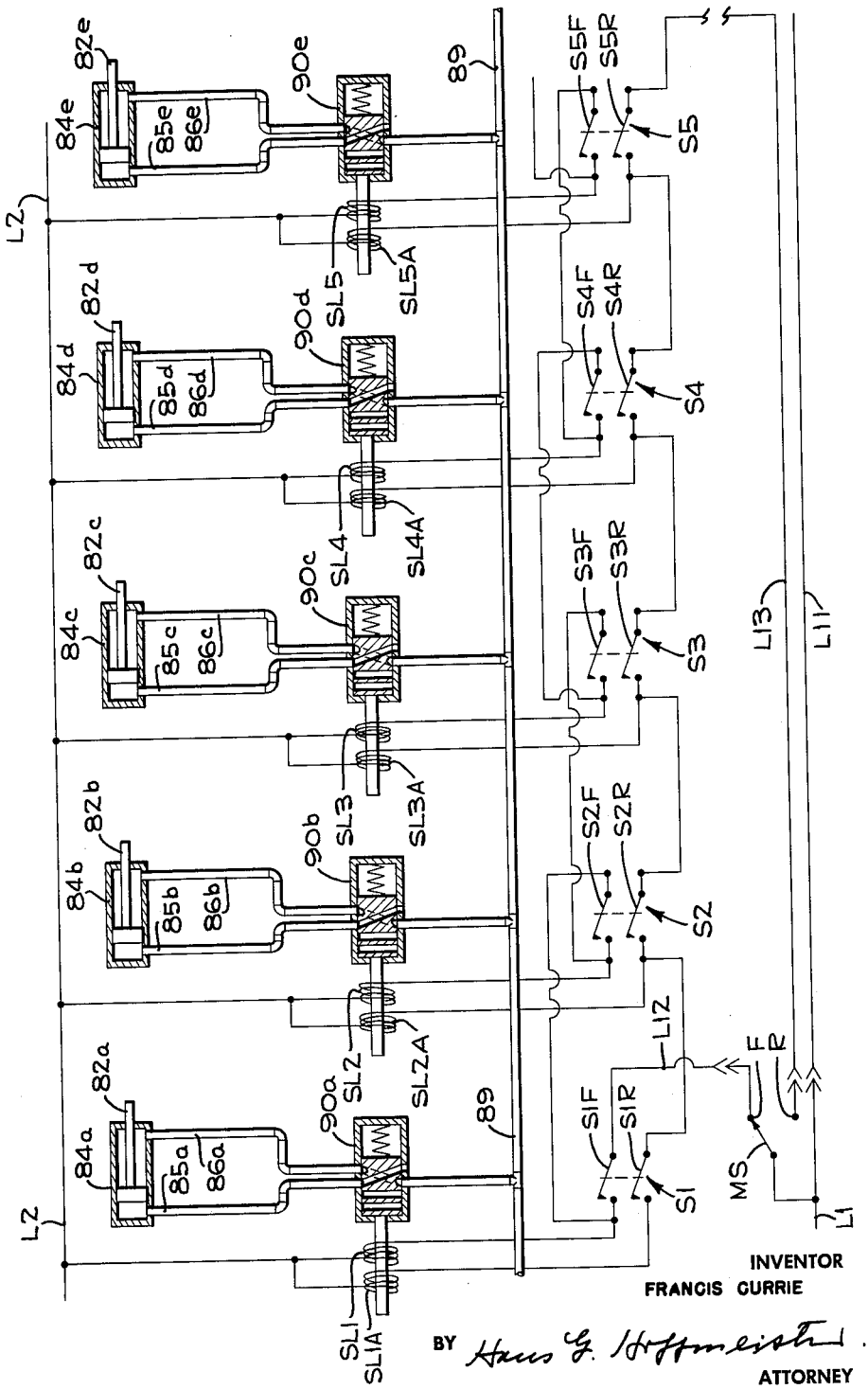

Dec. 28, 1965    F. CURRIE    3,225,893
ACCUMULATING CONVEYOR
Filed Oct. 15, 1962    6 Sheets-Sheet 6
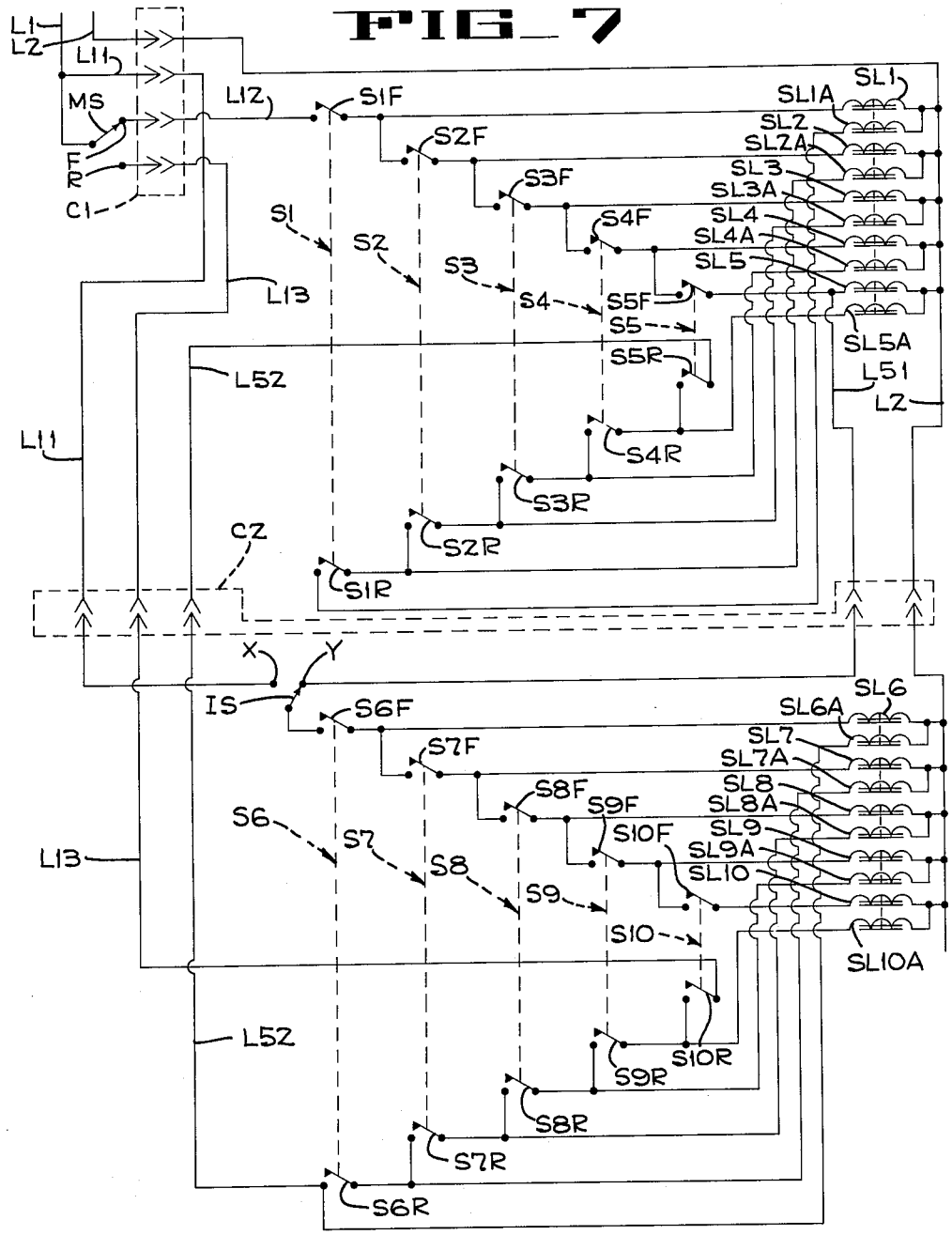
INVENTOR
FRANCIS CURRIE
BY *Hans G. Hofmeister*
ATTORNEY

United States Patent Office 3,225,893
Patented Dec. 28, 1965

3,225,893
ACCUMULATING CONVEYOR
Francis Currie, San Jose, Calif., assignor to FMC Corporation, San Jose, Calif., a corporation of Delaware
Filed Oct. 15, 1962, Ser. No. 230,340
17 Claims. (Cl. 198—127)

The present invention pertains to accumulating conveyors and more particularly to accumulating conveyors of the type using positively driven or "live" rollers to convey the loads thereon.

While driven or live roll conveyors, wherein a plurality of rollers are arranged in spaced, side-by-side relationship, are well known in the handling of articles in production lines and the like, many problems have arisen in connection with the use of such equipment. Among the major problems is that of accumulation of the articles that are conveyed, and particularly the prevention of collisions and harmful jostling of the articles during stoppage upon the conveyor.

In addition to the general problem of providing for accumulation, this type of apparatus involves the additional problem of providing for the selective removal of an article from within a continuous line of articles. On conveyors of considerable length it may prove desirable to accumulate at certain intermediate points on the conveyor as well as at the end of the conveyor. In addition, in some types of processing or production lines it is highly desirable to provide for quick reversibility in the conveyor and in the direction of accumulation without making major adjustments.

All of these specific service requirements have posed a difficult problem for the conveyor designer, and none of the conventional live roll conveyor structures has been able to satisfactorily solve all of these enumerated problems.

On prior known live roll conveyors accumulation has generally been accomplished either by making certain ones of the rollers sensitive to the weight of an article supported thereby, or by providing additional mechanisms at spaced locations along the conveyor which may be tripped to actuate controls for stopping the rotation of the carrier rollers. While such systems perform adequately for conveying certain types of loads and for uniform articles, these systems have generally not proven effective where the articles are of diverse shapes, sizes or weights. The problem is especially acute where articles are narrow at the bottom and wide at the top or in an intermediate portion, such as is the case with certain barrels, bushel baskets, and the like. It has been found that the narrow bottom portions of these articles which rest upon the carrier rolls will frequently miss the sensing roll or the stop trip switch, causing collisions between adjacent articles to occur.

It is, therefore, an object of the present invention to provide an improved accumulating conveyor.

Another object of the invention is to provide a conveyor utilizing positively driven roller conveying means wherein each roller is sensitive to article loads imposed thereon to effect the regulated accumulation of articles of a wide variety of shapes, sizes or weights.

Another object of the present invention is to provide a conveyor having positively driven, spaced rollers which are adapted to function in a cooperating manner to attain the continuous, properly spaced accumulation of articles without permitting collisions to occur between articles.

Another object is to provide a driven roll conveyor which will automatically operate to fill the space left open in an accumulated line of articles when one of the intermediate articles is removed from the conveyor.

Another object of the present invention is to provide a live roll conveyor having means for accumulating articles at selected points along the length of the conveyor.

Another object is to provide a driven roller type conveyor having means for substantially instantaneously changing the points of accumulation in accordance with a change in the direction of movement of the articles upon the conveyor.

Another object is to provide an electrical and pneumatic circuit to control the disposition of articles propelled by a live roll conveyor and attain their close accumulation without collision or other undue jostling.

Another object of the invention is to provide an improved system for driving a plurality of spaced rollers to propel articles placed randomly thereon into a continuously accumulating line.

Other objects and advantages of the present invention will become apparent from the following description and the accompanying drawings in which:

FIGURE 1 is a broken, fragmentary side elevation of the conveyor of the present invention.

FIGURE 2 is a fragmentary perspective of the upper section of the conveyor of FIGURE 1, showing the rollers and their driving structure with parts being broken away for the purpose of clarity.

FIGURE 4 is an enlarged fragmentary side elevation viewed as indicated by the lines 4—4 of FIGURE 3 with parts being broken away for the purpose of clarity.

FIGURE 5 is an enlarged section taken along lines 5—5 of FIGURE 3.

FIGURE 6 is a partially diagrammatic, partially schematic view illustrating the electrical and pneumatic circuits for a portion of the conveyor of FIGURE 1.

FIGURE 7 is a schematic illustrating the electrical circuit for the conveyor of FIGURE 1.

Figure 3:
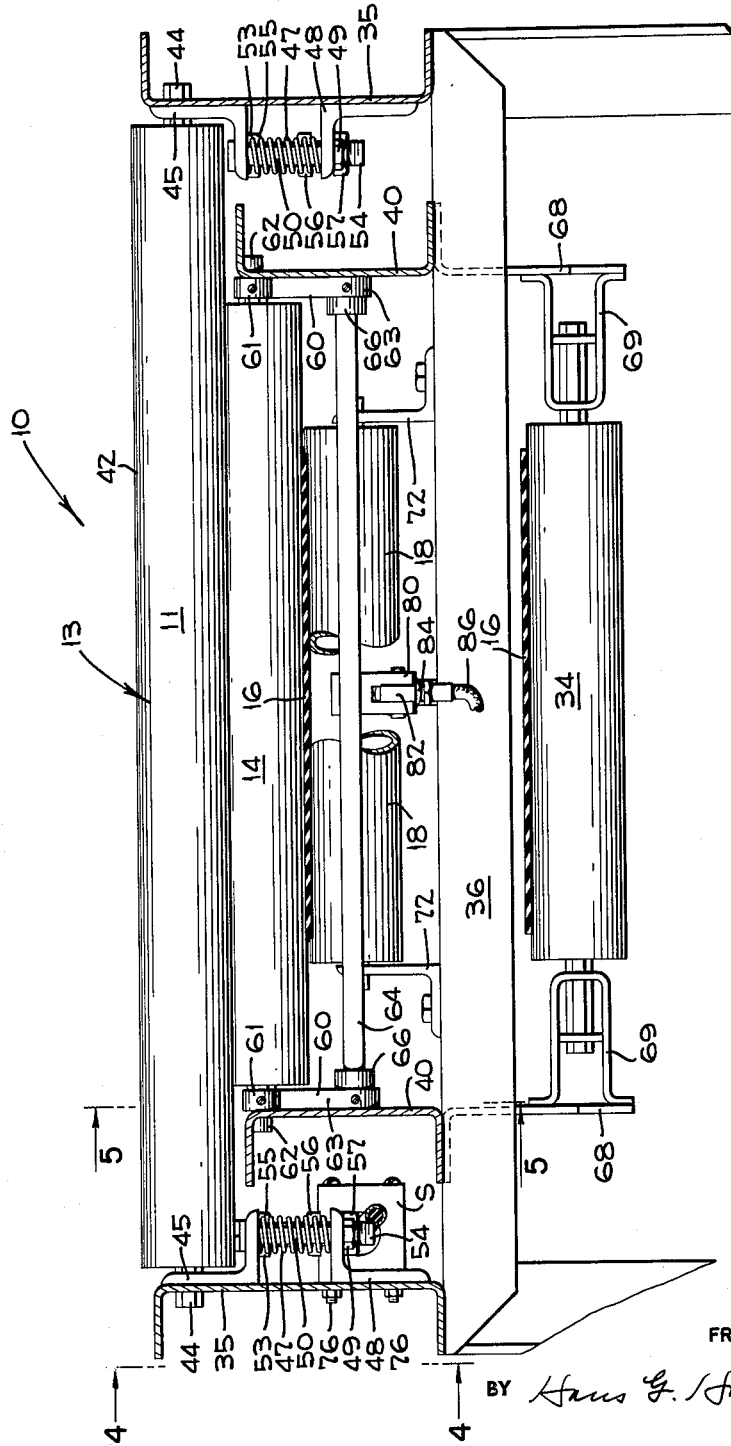
FIGURE 3 is an enlarged section taken along lines 3—3 of FIGURE 1.

Referring now particularly to FIGURE 1, which illustrates an embodiment of the present invention, a portion of a conveyor 10 for moving packages, cans, or other articles of random sizes, shapes, and weights, is there shown. The upper or carrier portion of the conveyor is comprised of a series of spaced, positively driven carrier rollers 11 for continuously conveying articles along the length of the conveyor. The rollers are slightly depressible under a load condition for a purpose later to be made clear. In the present embodiment, each group of six adjacent rollers is tied together and forms a movable roller section 13 which may be depressed as a single unit. The six carrier rollers which comprise each roller section 13 are driven by three drive rollers 14 positioned immediately beneath the carrier rollers. The drive rollers, in turn, are driven by means of an endless friction belt 16 which is rotatably supported at the longitudinal ends of the conveyor by pulleys 17 (one only being shown in FIGURE 1). The belt is supported throughout its upper run by means of a plurality of spaced idler rolls 18. While FIGURE 1 illustrates the normal or unloaded position of the conveyor wherein the upper run of the belt is substantially flat, it will be understood that the belt is adapted to flex about the idler rolls 18 during periods when certain of the drive rollers 14 are depressed, in a manner and for a purpose later to be more fully explained.

The belt is continuously driven during operation of the conveyor by means of a suitable reversible motor 20 which is operatively connected to the belt through a conventional chain and sprocket drive 21. The drive 21 rotates a friction-surfaced drive pulley 22 about which the belt is trained by a pressure roller 24 and a cornering pulley 25. In order to provide for flexing of the belt, a weighted take-up roller 27 is utilized. FIGURE 1 depicts in full lines the lowermost or normal position of the take-up roller 27, and shows in phantom lines the position which the roller may assume upon flexing of the belt about the rollers 18. The take-up roller is rotatably supported by a slidable carriage 28 which rides upon a rigid, vertical post 29. The motor 20, chain and sprocket drive 21, pressure roller 24, cornering pulley 25, and the rigid post 29 are supported upon a frame 30 which extends beneath the conveyor and is carried by conveyor support legs 31. Additional legs 31 also serve to support the ends of the conveyor as shown in FIGURE 1. Tautness is maintained upon the lower run of belt 16 by snub rollers 33, at either side of and above the path of movement of the take-up roller 27, and snub rollers 34 spaced along the conveyor.

The upper or carrier section of the conveyor (FIGS. 2 and 3) is supported by longitudinally extending outer channel members 35, one at either side of the conveyor which are tied together by a plurality of angled cross beams 36 that are welded to the channel members and spaced along the length of the conveyor. The channel members are carried by the support legs 31. Extending parallel to the outer channel members 35 are a pair of inner channel members 40 both of which are securely fastened, as by welding, to the cross beams 36 and extend the full length of the conveyor. The outer channel members 35 serve to floatably support the aforementioned carrier rollers 11 which propel the articles along the conveyor, while the inner channel members 40 generally support the drive rollers 14.

The carrier rollers 11, which are of conventional design, may be comprised of steel cylinders 42 (FIG. 5) which are freely rotatable about the axis of the roller and are rotatably supported at their ends by pins having hexagonally shaped extensions 44. The extensions are inserted through longitudinally extending angle members 45 and are rigidly secured thereto so that their outer ends project outwardly of the angle. Each angle member 45 is long enough to accommodate the aligned ends of the six carrier rollers 11 which comprise one of the aforementioned movable roller sections 13. Each angle 45 is mounted at its ends upon compression springs 47 which extend between the angle member and brackets 48 welded to the interior of the associated outer channel member 35. Upward movement of the angle members 45 is limited by nuts 49 on the lower portion of guide bolts 50 which extend through the springs and extend slidably through the angles 45 and the brackets 48.

As a package or other article to be conveyed is received upon the carrier rollers 11 associated with a particular angle 45, the angle will be depressed to a certain extent against the compression springs 47. The outermost ends of the hexagonal extensions 44 are slidably received in slots 51 formed in the outer channel members 35 (FIG. 4) to guide the angle in its vertical movement. It can be seen, therefore, that each roller section 13, comprising six carrier rollers tied together by angles 45, floats upon the compression springs 47 during the operation of the conveyor.

Two adjustable stop means 53 (FIG. 4) are used to limit the distance which each roller section 13 and its rollers 11 may be moved vertically. Each stop means 53 comprises a round headed bolt 54 which is tightly fixed to the angle 45 by a nut 55. The lower end of the bolt 54 extends slidably through one of the brackets 48. Threaded onto the bolt are a pair of nuts 56 and 57, one being on each side of the inwardly projecting flange on the bracket 48. The distance separating the nuts 56 and 57, therefore, determines the distance within which the roller section 13, and, hence, the carrier rollers 11 with move. This distance may be varied by adjusting the nuts 56 and 57 upon the bolt 54. This is of importance in setting the conveyor to effectively operate when conveying articles of different weights, as will presently be made clear.

As previously pointed out, the driving means for the carrier rollers 11 comprise a series of longitudinally spaced drive rollers 14, one drive roller serving to rotate two adjacent carrier rollers. As shown in full lines in FIG. 5, when no load is imposed upon the carrier rollers 11, the drive rollers are spaced slightly from the carrier rollers. This normal operating position is designed to prevent the wear of the rubber-covered drive rollers when they are not needed for driving. When a package or other container is passed onto the carrier rollers, they will promptly be lowered this slight distance, as illustrated by the phantom line positions of the carrier rollers in FIGURE 5, and moved into engagement with the drive rollers to thereby propel the package along the conveyor.

Each of the drive rollers 14 is mounted at its ends in the apex of an L-shaped arm 60 which has a horizontal arm 61 pivotally mounted upon an inner channel member 40 by means of a projecting pin 62, and a vertical arm 63 pivotally mounted by a tie rod 64 upon a connecting bar 66. Each tie rod 64 extends across the conveyor and links the two ends of one of the drive rollers through its respective L-shaped supporting arms 60 (FIG. 3). One connecting bar 66 is associated with each side of each roller section 13, the connecting bars serving to pivot its three drive rollers out of engagement with the associated carrier rollers and into the phantom line position of FIGURE 5 to thereby withdraw the driving power from the carrier rollers.

FIGURE 3 illustrates a typical mounting for the snub rollers 34 which tension the lower run of the belt. Aligned brackets 68 depend from the inner channel members 40 and mount apertured supports 69 which rotatably support the snub rollers 34. FIGURE 3 also illustrates the mounting of the idler rollers 18 by means of brackets 72 upstanding from the cross beams 36 for supporting the upper run of the belt.

Under normal operating conditions the belt 16 will continuously drive all of the drive rollers 14. When a package or other article to be conveyed is placed upon one end of the conveyor, it will slightly depress the rollers 11 of the roller section 13 on which it is placed so that they will make contact with the associated drive rollers 14 and be rotated in the proper direction to propel the package forwardly upon the conveyor. As the package leaves one roller section and moves onto another section, the rollers in the second section will also become engaged with the drive rollers to continue the propulsion of the package across the conveyor. This action will continue throughout the length of the conveyor under the aforesaid normal operating conditions. As each roller section 13 is depressed due to the weight of the article thereon, a limit switch S will be tripped. The limit switch S (FIGS. 2, 3 and 4) which comprises a conventional micro switch assembly, is fastened by means of bolts 76 to one of the outer channel members 35. The switch is actuated by means of a contact member 78 (FIG. 4) bolted to the inwardly protruding flange on the angle member 45 which moves with the associated roller section 13. As seen in the schematic illustrations of FIGURES 6 and 7, each switch S includes a pair of normally open contacts. These contacts are closed upon the depression of the conveyor section associated with the particular switch S. The contact member 78 for performing this function is in the form of a bolt which may be adjusted so as to close the contacts at different times dependent upon the particular weight load upon the conveyor section as determined by the compression of the springs 47. Since the function of the switches is to actuate means for positively lowering the drive rollers 14 out of driving engagement with the carrier rollers 11, in a manner to be described, the contact member 78 must be accurately adjusted because each article will coast to some extent upon the rollers 11 after the driving power has been removed therefrom. Thus, the contact member 78 should be set to deactivate the drive rollers with the article in such a position that it will coast to a stop and be fully supported upon the single roller section. i.e., the set of six rollers, which it has just deenergized. Of course, the coasting will be partially dependent upon the weight of the article, and, therefore, some range of coasting distances must be accommodated when conveying articles of different weights.

When certain switches have been closed, the drive rollers 14 of a given section 13 are moved out of engagement with the carrier rollers 11 by the downward and rearward movement of the associated connecting bar 66. This movement is accomplished by pneumatic means through a swivelling connector 80 (FIG. 5) which is journalled at its upper end upon the central tie rod 64 joining the pair of connecting bars 66 for the respective roller section 13. The lower end of the swivel member 80 is pivoted to one end of a piston rod 82 which operates within a pneumatic cylinder 84, its position therein being controlled by air lines 85 and 86. The cylinder is mounted at its forward end upon one of the cross beams 36 by means of a bracket 88. One pneumatic cylinder 84 and control therefor are provided for each conveyor section 13.

Compressed air is fed into one of the air lines 85 or 86 through an air line 89 (FIG. 6) connected to a compressor or other source of supply (not shown). A four-way solenoid-operated, spring-return valve 90 is operatively associated with each set of air lines 85, 86 and the main air line 89 to normally provide pressure through line 86 while allowing line 85 to exhaust. This pushes the piston 82 within the cylinder 84 to bring the connecting bars 66 to their uppermost position, as depicted in full lines in FIGURE 5, and to raise the drive rollers 14 into driving position. When the position of the valve is reversed, the functions of the air lines are switched and the line 85 receives pressure while the line 86 exhausts and the piston 82 is moved within the cylinder 84 to effect disengagement of the drive rollers. The spring return allows the valve to automatically reset itself in the normal operating position.

The conveyor of the present embodiment is divided into two conveyor sections, each conveyor section including five roller sections 13 and a switch S operatively associated with each. FIGURE 7 shows the general layout of the conveyor wiring system for the switches including electrical power supply lines L1 and L2. As mentioned, each switch S contains a pair of normally open contact points. For example, switch S1 consists of the normally open contacts S1F and S1R. In a similar manner, the switches S2 through S10 each includes a pair of normally open contacts, one of which, indicated by the letter F added to the reference character indicating the respective switch, functions when the conveyor is operating in a forward direction, and the other of which, indicated by the letter R added to the appropriate reference character, functions when the conveyor is operating in the reverse direction. Each switch S is associated with a pair of solenoids SL. For example, the contact point S1F of switch S1 is associated with a solenoid SL1 and contact point S1R is associated with solenoid SL1A. As can best be seen in the diagrammatic illustration of FIGURE 6, SL1 and SL1A in actuality comprise separate, insulated coils wound on a single movable core. In a similar manner, each of the other pairs of forward (F) and reverse (R) contacts included in the respective switches S2 to S10, inclusive, is associated with a pair of separate coils wound on one movable core. The core, when moved by energization of either of its associated coils, is adapted to change the position of the respective valve member 90 in the manner previously set forth to, in turn, change the position of the associated piston 82 and effect disengagement of the drive rollers 14 from the associated roller sections 13.

The operation of the conveyor 10 will be first described in relation to FIGURE 6 which depicts the first one of the two conveyor sections and its associated five switches. The pistons 82, cylinders 84, air lines 85, 86 and valves 90 have been given the subscripts a, b, c, d and e to identify the particular pneumatic members associated with a particular switch S, e.g., S1 is associated with cylinder 84a and valve 90a and S2 is associated with cylinder 84b and valve 90b, etc. When the conveyor is started and a connector member C1 (FIGURE 7), supplying power to the circuits is connected, the master switch MS should be set in one of two positions—position F for accumulation at the forward end of the conveyor, and position R for accumulation at the rearward end of the conveyor. FIGURES 6 and 7 illustrate the master switch as being set in the forward position, i.e., in the position in which it conditions the apparatus to handle articles fed onto the conveyor at its rearward end to be carried along the conveyor by the powered carrier rolls 11 and allowed to accumlate at the forward end of the conveyor. As each article rolls across a roller section 13, the switch S associated with that roller section will be closed, that is, both the forward and reverse contact points will be closed to condition their circuits for possible energization of their respectively associated solenoids. However, neither of these solenoids will be energized until an article is supported upon the roller section at the forward end of the conveyor. At that time, the switch S1F associated with the foremost roller section 13 will be closed to allow the line voltage to pass a current from line L1 through the master switch MS, through the closed contact S1F, and through the solenoid SL1 to the voltage line L2. The resulting actuation of the solenoid SL1 will move the core of the valve 90a to the right (as viewed in FIGURE 6) to allow air to be let in through line 85a and exhausted from line 86a to power the piston 82a to the right and lower the associated connecting bars 66 and the drive rollers 14 connected thereto out of engagement with the six carrier rollers 11 of the foremost roller section 13 on the conveyor. If at that time an article is on the roller section directly behind the first roller section, both switches S1 and S2 will be closed, and a parallel circuit will also be closed through contact S2F and the solenoid SL2 to voltage line L2. This will move the core of the valve member 90b, reverse the direction of air flow in lines 85b and 86b and force the piston 82b of cylinder 84b to the right to move the drive rollers 14 of the second roller section out of engagement with the associated carrier rollers. In a similar manner, each of the switches S3, S4 and S5 will close the associated contacts S3F, S4F, and S5F upon the reception of articles or other loads upon the respectively associated roller sections. Therefore, once an article is received by the forward roller section, a circuit will be closed to remove the driving power from the carrier rollers 11 of that section and allow the article to gently coast to a stop thereon. The point at which the article starts to coast, and consequently the place on the roller section at which it will come to rest, can be established by adjusting the contact member 78, as previously explained, and/or by adjusting the compression in the springs 47 which resist downward movement of the roller section.

FIGURE 7 depicts the wiring for a conveyor comprising two conveyor sections, each of which includes five roller sections 13 in accordance with the above description. In this view, also, the master switch MS engages the switch contact F for forward operation of the conveyor. The voltage from line L1 passes a current through line L12 to switches S1 through S5. It is to be noted that a parallel line L11 is also taken off the voltage line L1 and led through a separate connector C2. This connector is provided for the purpose of electrically connecting the second conveyor section to the first conveyor section for operation in conjunction therewith and as an extension thereof, the second conveyor section also including five roller sections with their associated switches S6 through S10 and solenoids SL6 through SL10. The second conveyor section has an intermediate switch IS near the connector C2, which switch includes two contact points X and Y. When the switch IS engages the contact Y as shown in FIGURE 7 each of the switches S6 through S10 are connected in series with the switches S1 through S5 through the line L51 linking S5F with S6F. This means that the switches controlling the ten roller sections of the augmented conveyor are all placed in series allowing each solenoid to be actuated in turn, starting with the first solenoid SL1. When one of the intermediate solenoids in the string is deenergized, all of the solenoids rearward of the deenergized one will be affected. This will, of course, occur when a package or article is removed from within a continuous line of articles on the conveyor. Since the actuation of any particular solenoid depends upon the energization of all of the solenoids forward of that solenoid, its circuit and all circuits rearward of the one associated with the intermediate roller section from which the package is removed will be broken. As the solenoids are deenergized, the springs within the valves 90 return the pistons 82 to their normal positions to reengage the drive rollers 14 with the carrier rollers 11. This allows all of the articles on the conveyor to be moved forward to fill the space previously occupied by the article which was removed.

In order to convey articles on the conveyor in the reverse direction and to accumulate the articles, the motor 20 is switched to run in the opposite direction and the master switch MS is thrown to engage the reverse contact (R) to allow current to be drawn through line L13. In this case the first solenoid to be energized will be solenoid SL10A through the contact S10R. Once this contact is closed a parallel circuit through switch S9R and its associated solenoid SL9A is conditioned so that it may be completed by closing its switch S9 in response to arrival of an article upon its associated roller section 13. Similarly, each of the contacts S8R, S7R, and S6R may be closed to energize its associated solenoid SL8A, SL7A, and SL6A, respectively, provided all switches beyond it in the direction of article movement are already closed. Once all of the solenoids SL10A through SL6A are closed, a parallel circuit is conditioned through the line L52 and through the contact S5R and its associated solenoid SL5A. In a similar manner, therefore, the solenoids SL5A through SL1A will be successively closed when an article is received upon its associated roller section, provided all switches beyond it in the direction of article movement are already closed. This instantaneous reversal of accumulation in conjunction with reversal of the direction of movement of the driving belt has proven to be of significant value in operations where unloading of the conveyor may conveniently take place at either end of the conveyor with stoppages occurring irregularly at one or the other of the ends of the conveyor.

In addition to the reversing feature of the conveyor, another feature is the provision of a separate zone of accumulation on the conveyor. In order to accomplish this, the intermediate switch IS is thrown to engage the contact X, connecting the line L1 directly to the contact S6F through line L11. Then, when the switch S6F is closed, the solenoid SL6 will be energized to deactivate the roller section associated with that solenoid regardless of whether or not any or all of the solenoids SL1 through SL5 are energized. In the manner previously described, each of the solenoids SL7, SL8, SL9 and SL10 will be energized in turn as articles accumulate on the roller sections associated with these solenoids. This feature is of significant advantage in allowing for unexpected stoppages on the first portion of the conveyor so that accumulation and conveyor operation may still be carried on.

It will be understood that additional connectors such as C2 could be provided in the conveyor to attach additional conveyor sections onto the line. This would provide additional spaced points where accumulation could occur if desired.

It will be seen, therefore, that the present invention provides a live roll conveyor which will accumulate articles by removing the driving power from the conveying rollers once the articles are properly arranged upon the conveyor. The operation is economical and efficient, and it may easily be regulated by simple adjustment of springs and other devices located conveniently upon the conveyor. A significant feature is that the rollers are particularly adapted to sense any article regardless of weight, shape or size immediately upon its entry upon a roller section so that there will in no case be collisions between adjacent articles. The system is controlled by an electrical circuit arrangement which provides the features of reversibility of accumulation, selective zones of accumulation, and selective operation of one or more portions of the conveyor.

While one embodiment of the present invention has been shown and described it will be understood that various changes and modifications may be made therein without departing from the spirit of the invention or the scope of the appended claims.

The invention having thus been described, what is believed to be new and desired to be protected by Letters Patent is:

1. A conveyor comprising a plurality of rollers horizontally arranged in side-by-side relationship, means mounting all of said rollers for vertical movement, said mounting means including means for biasing said rollers upwardly, and drive means normally spaced from and below said rollers, said rollers being movable into driving engagement with said drive means upon the reception of an article upon the rollers to effect rotation of the rollers and thereby propel the article along the conveyor.

2. In a conveyor, the combination comprising a plurality of rollers horizontally aligned in spaced side-by-side relationship, means mounting all of said rollers for vertical movement, said mounting means including means for biasing said rollers upwardly, drive means for driving said rollers to propel articles received upon the rollers along the conveyor, switch means adapted to be actuated by the depression of any one of the rollers due to the weight of an article received thereon, and means operable upon actuation of said switch means for removing said drive means from certain of said rollers upon which said article is supported.

3. In a conveyor, the combination comprising a plurality of rollers horizontally aligned in spaced side-by-side relationship, means mounting all of the rollers for vertical movement, said mounting means including means for tying a group of adjacent rollers together for conjoint movement and biasing means for biasing the rollers of said group upwardly, drive means for driving said rollers to propel articles along said conveyor, switch means adapted to be actuated by the depression of said group of adjacent rollers due to the weight of a moving article on at least one of the rollers of said group, and means operable upon actuation of said switch means to remove said drive means from said group of rollers to allow said moving article to come to a stop upon the rollers of said group.

4. A conveyor comprising a plurality of carrier rollers horizontally aligned in spaced side-by-side relationship, means mounting the ends of each carrier roller for vertical movement, a rigid member tying a group of adjacent carrier rollers together for conjoint movement, adjustable spring means urging said carrier rollers upwardly, a plurality of drive rollers located beneath said carrier rollers for rotating said carrier rollers to propel articles along the conveyor, switch means adapted to be actuated by the depression of said group of carrier rollers against the urging of said spring means due to the weight of a moving article on at least one of the rollers of said group, and means for moving said drive rollers downwardly out of driving engagement with said carrier rollers in response to the actuation of said switch means to allow said moving article to come to a stop upon the carrier rollers of said group.

5. A conveyor comprising a plurality of carrier rollers horizontally aligned in spaced side-by-side relationship, means mounting the ends of each roller for vertical movement including means biasing said rollers upwardly, a plurality of drive rollers mounted below the spaces between said carrier rollers with each drive roller having its exterior surface normally slightly spaced from the overlying two adjacent carrier rollers, and means for continuously driving said drive rollers, said carrier rollers being depressible into frictional engagement with said drive rollers upon the reception of an article upon said carrier rollers to activate said carrier rollers and cause them to propel said article along the conveyor.

6. A conveyor comprising a plurality of carrier rollers horizontally aligned in side-by-side relationship, a plurality of drive rollers horizontally aligned in spaced side-by-side relationship and mounted below said carrier rollers with their exterior surfaces normally spaced slightly from the exterior surfaces of said carrier rollers, means mounting said carrier rollers for vertical movement including means biasing the carrier rollers upwardly, drive means for continuously driving said drive rollers, said carrier rollers being depressible into frictional engagement with said drive rollers upon the reception of an article upon the carrier rollers to rotate the carrier rollers and propel said article along the conveyor, and control means mounted below and associated with particular groups of adjacent carrier rollers, said control means being operable upon depression of the rollers of one of said groups to move the drive rollers out of driving engagement with the carrier rollers of the said one group and cause the article on that group of rollers to come to a stop upon the conveyor.

7. An accumulating conveyor comprising a plurality of horizontally arranged rollers in side-by-side relationship, said rollers being divided into a plurality of groups of rollers with each group comprising a number of adjacent rollers, means mounting said groups of rollers for vertical movement including means biasing said groups upwardly, drive means for driving said rollers to propel articles thereon horizontally along the conveyor, and control means associated with each of said groups of rollers being conditionally operable upon actuation by depression of the respective associated groups due to the weight of articles thereon to remove said drive means from the rollers of the groups depressed and allow the article thereon to coast to a stop, said control means of the successive groups being arranged so that the drive means will not be removed from the rollers of one group unless all of the control means are actuated between the said one group and the control means associated with an accumulation point on the conveyor whereby articles propelled along the conveyor will continuously accumulate in spaced relationship from said accumulation point.

8. An accumulating conveyor comprising a plurality of horizontally aligned rollers in side-by-side relationship, means mounting said rollers for vertical movement including means biasing said rollers upwardly, drive means engageable with said rollers to rotate them and propel articles thereon horizontally along said conveyor, said rollers being divided into a plurality of groups of rollers with each group comprising a number of adjacent rollers, a switch associated with each group, each of said switches being closed upon depression of the rollers of its associated group due to the weight of an article traveling thereon, and means operable upon the closing of one switch to disengage said drive means from the rollers associated with the said one switch provided that all of the switches are closed between the said one switch and a switch associated with an accumulation zone on the conveyor, whereby articles propelled along the conveyor will continuously accumulate in spaced relationship from said accumulation zone.

9. An accumulating conveyor comprising a plurality of horizontally aligned rollers in side-by-side relationship and having an accumulation zone at one end thereof, means mounting said rollers for vertical movement including means biasing said rollers upwardly, drive means engageable with said rollers to rotate them and propel articles thereon horizontally along said conveyor, said rollers being divided into a plurality of groups of rollers including a group defining said accumulation zone with each group comprising a number of adjacent rollers, a switch associated with each group, each of said switches being closed upon depression of the rollers of its associated group due to the weight of an article traveling thereon, means operable upon the closing of one switch to disengage said drive means from the rollers associated with the said one switch provided that all of the switches are closed between the said one switch and the switch associated with said accumulation zone at one end of the conveyor whereby articles propelled along the conveyor will continuously accumulate in spaced relationship rearwardly from said end of the conveyor, and means selectively operable to reverse the direction of accumulation to change the operation of said switches and said zones of accumulation to another part of the conveyor whereby articles will continuously accumulate in spaced relationship from said other part of the conveyor.

10. An accumulating conveyor comprising a plurality of horizontally aligned rollers in side-by-side relationship and having a first and a second accumulation zone thereon, means mounting said rollers for vertical movement including means biasing said rollers upwardly, drive means engageable with said rollers to rotate them and propel articles thereon horizontally along said conveyor, said rollers being divided into a plurality of groups of rollers including individual groups defining said accumulation zones with each group comprising a number of adjacent rollers, a switch associated with each group, each of said switches being closed upon depression of the rollers of its associated group due to the weight of an article traveling thereon, and means operable upon the closing of one switch to disengage said drive means from the rollers associated with the said one switch provided that all of the switches are closed between the said one switch and the switch associated with said first accumulation zone on the conveyor whereby articles propelled along the conveyor will continuously accumulate in one direction in spaced relationship from said accumulation zone, and means selectively operable to change the relationship of said switches and cause articles to accumulate at said second accumulation zone on said conveyor whereby said articles will continuously accumulate in said one direction in spaced relationship from both of said accumulation zones.

11. An accumulating conveyor comprising a plurality of horizontally aligned and spaced carrier rollers for propelling articles placed thereon along the length of the conveyor, means mounting the carrier rollers for vertical movement including means biasing said rollers upwardly, a plurality of drive rollers horizontally arranged beneath said carrier rollers for frictionally engaging and rotating the carrier rollers, said carrier rollers being normally spaced from said drive rollers and being movable into engagement therewith when the carrier rollers are depressed due to the weight of an article thereon, an endless belt mounted beneath said drive rollers for continuously driving the drive rollers, and control means operably associated with said carrier rollers for sensing articles thereon, said control means being operable to move said drive rollers out of engagement with the article-supporting carrier rollers when said carrier rollers are supporting an accumulated line of articles upon the conveyor to thereby prevent continued rotation of said carrier rollers.

12. A conveyor system comprising a plurality of carrier rollers in side-by-side relationship, said rollers being divided into a plurality of groups of rollers with each group comprising a number of adjacent rollers, means for driving said carrier rollers to propel articles along the conveyor, switch means operatively associated with each group, means for actuating said switch means in response to the reception of an article upon the carrier rollers of the associated group, control means operatively associated with each of said switch means, said control means being conditionally operative to disengage the driving means from the carrier rollers of the group associated with a switch means which is actuated, said switch means being electrically connected in series relationship so that said control means will not be operative unless each succeeding switch means is actuated beginning wtih the switch means associated with the group of carrier rollers at one end of the conveyor to cause said articles to accumulate upon the conveyor in continuous spaced relationship starting at said one end of the conveyor, and means selectively operable to reverse the direction of accumulation to cause said articles to accumulate in continuous spaced relationship starting at the other end of the conveyor.

13. A conveyor system comprising a plurality of carrier rollers in side-by-side relationship, said rollers being divided into a plurality of groups of rollers with each group comprising a number of adjacent rollers, means for driving said carrier rollers to propel articles along the conveyor, switch means operatively associated with each group, means for actuating said switch means in response to the reception of an article upon the carrier rollers of the associated group, control means operatively associated with each of said switch means, said control means being conditionally operative to disengage the driving means from the carrier rollers of the group associated with a switch means which is actuated, said switch means being electrically connected in series relationship so that said control means will not be operative unless each succeeding switch means is actuated beginning with the switch means associated with the group of carrier rollers at one end of the conveyor to effect accumulation of articles upon the conveyor in continuous spaced relationship starting at said one end of the conveyor, and means selectively operable to initiate a second zone of accumulation upon a group of rollers spaced rearwardly from said one end of the conveyor whereby articles moving upon said conveyor may be accumulated at either said one end of the conveyor or at said second zone of accumulation.

14. In an accumulating conveyor structure, the combination comprising drive means for positively driving articles along the conveyor, said means being longitudinally divided into a plurality of sections for successive propulsion of an article, a control means associated with each of said sections for removing the driving force from said sections, means associated with said control means and each of said sections and being sensitive to the weight of an article thereon to actuate the associated control means for stopping the travel of said article upon the conveyor, power means for operating said control means, said control means being connected in series with said power means whereby actuation of said control means will occur only in series starting with the control means associated with the section at one end of the conveyor to effect accumulation of articles in regularly spaced relationship rearwardly from said one end, and means selectively operable to place a second series of sections comprising a continuous series of sections of said plurality of sections which are spaced rearwardly from said one end of the conveyor in series connection with said power means to effect accumulation of articles in regularly spaced relationship rearwardly from said one end of the conveyor and rearwardly from the foremost section of said second series of sections.

15. In an accumulating conveyor structure, the combination comprising drive means for positively driving articles along the conveyor, said means being longitudinally divided into a plurality of sections for successive propulsion of an article, a control means associated with each of said sections for removing the driving force from said sections, means associated with said control means and each of said sections and being sensitive to the weight of an article thereon to actuate the associated control means for stopping the travel of said article upon the conveyor, power means for operating said control means, said control means being connected in series with said power means whereby actuation of said control means will occur only in series starting with the control means associated with the section at one end of the conveyor to effect accumulation of articles in regularly spaced relationship rearwardly from said one end, and means selectively operable to reverse the series connection of said control means with said power means whereby actuation of said control means will occur only in a series relationship starting with the control means associated with the section at the other end of the conveyor.

16. In an accumulating conveyor the combination comprising means for driving articles along said conveyor, means for successively removing driving power from successive portions of said driving means to effect accumulation of the articles upon said conveyor rearwardly from one part of the conveyor, and selectively operable means for changing the operation of the driving power removing means to effect accumulation of the articles rearwardly from another part of the conveyor.

17. In an accumulating conveyor the combination comprising means for driving articles along said conveyor, means for successively removing power from successive portions of said driving means to cause the articles to serially accumulate upon said conveyor at one end of the conveyor, and selectively operable means for changing the operation of said driving power removing means to cause the articles to serially accumulate at the other end of said conveyor in response to a reversal in the direction of movement of said articles upon the conveyor.

References Cited by the Examiner

UNITED STATES PATENTS

| | | | |
|---|---|---|---|
| 633,572 | 9/1899 | Cromwell | 198—127 |
| 2,234,162 | 3/1941 | Anderson | 198—127 |
| 2,785,785 | 3/1957 | Macaluso | 198—21 |
| 3,012,652 | 12/1961 | Poel et al. | 198—127 |
| 3,047,127 | 7/1962 | McGow | 198—160 |
| 3,118,512 | 1/1964 | Fishburne | 198—78 |

SAMUEL F. COLEMAN, *Primary Examiner.*

WILLIAM B. LABORDE, *Examiner.*